United States Patent
Goppion

(10) Patent No.: US 9,532,664 B2
(45) Date of Patent: Jan. 3, 2017

(54) SHOWCASE HAVING SHAPED AND GLUED WALL MADE OF A TRANSPARENT MATERIAL

(71) Applicant: GOPPION S.P.A., Trezzano Sul Naviglio (IT)

(72) Inventor: Alessandro Goppion, Milan (IT)

(73) Assignee: GOPPION S.P.A., Trezanno Sul Naviglio (IT)

( * ) Notice: Subject to any disclaimer, the term of this patent is extended or adjusted under 35 U.S.C. 154(b) by 0 days.

(21) Appl. No.: 14/811,753

(22) Filed: Jul. 28, 2015

(65) Prior Publication Data
US 2016/0029817 A1 Feb. 4, 2016

(30) Foreign Application Priority Data

Jul. 31, 2014 (IT) .............................. MI2014A1391

(51) Int. Cl.
*A47F 7/00* (2006.01)
*A47F 3/00* (2006.01)
(Continued)

(52) U.S. Cl.
CPC ................ *A47F 7/00* (2013.01); *A47F 3/001* (2013.01); *A47F 3/002* (2013.01); *A47F 3/005* (2013.01);
(Continued)

(58) Field of Classification Search
CPC ............ A47F 3/00; A47F 3/005; A47F 3/007; A47F 3/12; A47F 2003/008
(Continued)

(56) References Cited

U.S. PATENT DOCUMENTS 2,023,260 A * 12/1935 Beers ........................ A47F 3/12
 312/114
3,341,267 A * 9/1967 Weitzman ................. A47F 3/12
 221/155
(Continued)

FOREIGN PATENT DOCUMENTS

DE 4110942 A1 10/1991
DE 19739394 3/1999
(Continued)

OTHER PUBLICATIONS

Italian Search Report completed on Mar. 19, 2015 for Italian Application MI2014A1391 filed on Jul. 31, 2014 in the name of GOPPION S.P.A.
(Continued)

*Primary Examiner* — Daniel Rohrhoff
(74) *Attorney, Agent, or Firm* — Steinfl & Bruno, LLP

(57) ABSTRACT

A showcase is described. The showcase has at least a vertical side wall with an inner face and an outer face, and at least a horizontal upper wall, with a lower face and an upper face. The side and upper walls are both made of a transparent material and are fixedly fastened to one another at respective edges; the edges of the side and upper walls are shaped so as to comprise respective contact bands facing one another and glued to one another. The contact bands have two horizontal contact bands, one on the edge of the side wall, the other on the edge of the upper wall, and extending between an inner bound and an outer bound, wherein the outer bound is internal with respect to the outer face of the side wall. The upper wall rests horizontally on the side wall and the weight of the upper wall weighs directly on the side wall, without stressing the adhesive with which they are glued, ensuring the safety of the showcase; furthermore, the junction line between the walls is not visible on the side (Continued)

wall, since the outer bound of the contact bands does not reach the outer face of the side wall.

10 Claims, 3 Drawing Sheets

(51) Int. Cl.
*A47F 3/12* (2006.01)
*F16B 12/04* (2006.01)
*F16B 12/46* (2006.01)
*A47G 1/12* (2006.01)

(52) U.S. Cl.
CPC .............. *A47F 3/007* (2013.01); *A47F 3/12* (2013.01); *F16B 12/04* (2013.01); *F16B 12/46* (2013.01); *A47G 1/12* (2013.01)

(58) Field of Classification Search
USPC .................................................. 312/140, 114
See application file for complete search history.

(56) References Cited

U.S. PATENT DOCUMENTS

| | | | | | |
|---|---|---|---|---|---|
| 3,998,509 | A | * | 12/1976 | Hauser | ............... A47B 47/0033 24/341 |
| 4,660,903 | A | * | 4/1987 | Shinagawa | ........... A47F 3/0434 312/116 |
| 5,120,116 | A | * | 6/1992 | Amstutz | ................. A47F 3/005 312/114 |
| 5,524,977 | A | * | 6/1996 | Orawski | ................. A47F 3/005 312/114 |
| 6,398,322 | B1 | * | 6/2002 | Chaplin | ................... A47F 3/12 312/114 |
| 2006/0028102 | A1 | * | 2/2006 | Hahn | ...................... A47F 3/005 312/139.2 |
| 2015/0022066 | A1 | * | 1/2015 | Dimitrakos | ............... A47F 7/03 312/140 |
| 2015/0130334 | A1 | * | 5/2015 | Goppion | ................... A47F 5/00 312/140 |

FOREIGN PATENT DOCUMENTS

| | | |
|---|---|---|
| DE | 10341934 A1 | 5/2005 |
| DE | 202006017556 U1 | 2/2007 |
| EP | 1854953 A2 | 11/2007 |
| GB | 01959 | 0/1911 |
| GB | 726873 | 3/1955 |
| GB | 2245155 A | 1/1992 |
| JP | 2000160921 A | 11/1999 |
| WO | 2006/070428 A1 | 7/2006 |

OTHER PUBLICATIONS

Italian Written Opinion completed on Mar. 19, 2015 for Italian Application MI2014A1391 filed on Jul. 31, 2014 in the name of GOPPION S.P.A.
Italian Search Report issued on Feb. 20, 2015 for MI2014A001206 filed on Jul. 2, 2014 in the name of Goppion S.p.A.
Italian Written Opinion issued on Feb. 20, 2015 for MI2014A001206 filed on Jul. 2, 2014 in the name of Goppion S.p.A.
Italian Search Report issued on Feb. 10, 2015 for MI20141205 filed on Jul. 2, 2014 in the name of Goppion S.p.A.
Italian Written Opinion issued on Feb. 10, 2015 for MI20141205 filed on Jul. 2, 2014 in the name of Goppion S.p.A.

* cited by examiner

SHOWCASE HAVING SHAPED AND GLUED WALL MADE OF A TRANSPARENT MATERIAL

CROSS REFERENCE TO RELATED APPLICATIONS

The present application claims priority to Italian application MI2014A001391 filed on Jul. 31, 2014 which is incorporated herein by reference in its entirety.

FIELD

The present invention relates to a showcase for the preservation and the display of objects, such as typically works of art, objects of cultural heritage or other delicate objects in museums, exhibitions and the like.

In particular, the showcase may simply enclose the works, preventing contact by persons or objects, or it may be such as to ensure the preservation of the works in a protected environment; here and hereinafter, by protected environment an environment is meant where the atmosphere is controlled, through the monitoring of one or more parameters including temperature, humidity, dust content, pollutant content, in order to maintain the foreseen preservation conditions of the exhibits, and in which access to unauthorized personnel is prevented to prevent theft or damage of the exhibits.

BACKGROUND

Showcases of this type must therefore meet requirements of various types, in relation to the preservation and integrity of the exhibits. Moreover, of course, these showcases have to ensure the best visibility for the exhibits.

Systems for making fixed parts integral to one another are therefore very important, so as to ensure the necessary strength to the showcase.

In order to improve visibility, showcase manufacturers seek where possible to use transparent materials—typically glass—for the showcase walls. In addition to ensuring better visibility of the exhibits, the extensive use of glass is often desired by showcase designers since the transparency of the material allows giving maximum emphasis to the exhibits.

Therefore, showcases have been developed with a base surmounted by a case formed by walls; the base accommodates all the necessary technical components to ensure that the environment within the case is protected and is thus normally closed by metal walls, which conceal all technical components from view; vice versa, the case walls are totally or partly made of glass for the above reasons. The technical components can also be accommodated in compartments extending vertically, especially in the case of showcases leaning on walls.

The case may be made of transparent material walls all integral to one another, so as to form a bell that is lifted from the base to access inside the showcase. Or, some walls (fixed walls) are integral to the base and to one another while one or more walls (opening walls) are movable, thanks to suitable opening mechanisms.

In order to make the fixed walls of transparent material integral to one another, it is normal to bond the walls to one another by means of suitable adhesives, along adjacent peripheral edges, often cut at 45°; these junctions are also known as miter-square junctions.

Thanks to modern adhesives, it is possible to ensure good stability and safety of bonding. However, it is sometimes possible that abnormal, unpredictable or unforeseen conditions may lead to a bonding strength lower than expected. This can happen for example because some abnormal and not necessarily detectable condition has occurred in the bonding step which can lead (immediately or maybe later) to a reduction of the adhesion between the glued parts. Or, it may happen that particular environmental conditions (in terms of temperature, humidity and exposure to light or to atmospheric agents) may change—worsening them—the adhesion features of a bonding over time, despite it was made to perfection.

In these cases, the showcase will be exposed to the risk of detachment between the walls, and thus of collapse. This is a risk that occurs mostly in the bonding between a vertical wall and the horizontal upper wall (ceiling), where the weight of the horizontal wall is relieved on the vertical wall through the adhesive, stressing it: in case of failure of the adhesive, the collapse of the horizontal wall right on the works in the showcase at the time of the collapse is immediate and inevitable. Clearly, therefore, it is a risk that, while minimum, should be absolutely avoided: in this case, in fact, instead of protecting the works on display, the showcase would be a hazard itself.

Also, in any case, even the best adhesives have a decay of their grip over time and therefore are only guaranteed for a limited time; when this time limit is reached, replacing the showcase is inevitable, although apparently still intact.

However, in the cases where it is desired to exclude any risks without giving up a showcase with transparent walls, cutting the edges to 45° is usually given up, especially for bonding together a vertical wall and the horizontal upper wall: the latter is glued on top of the vertical wall, leaving the edges simply straight, at 90° with respect to the faces of the walls; these junctions are also known as juxtaposed junctions. In this case, the weight of the horizontal upper wall does not stress the adhesive, reducing the risk of failure; moreover, when failure occurs, the horizontal upper wall is still resting on the vertical wall and therefore does not collapse on the works contained in the showcase.

However, while in a showcase in which the walls are joined at 45° the junction line between the walls is located at the geometrical edge of the of the showcase and is therefore substantially invisible to the observer, in a showcase in which the walls are joined at 90° the junction line between the vertical wall and the horizontal wall is lower than the geometrical edge of the showcase by a distance equal to the thickness of the horizontal upper wall. In this position, the junction line between the walls is clearly visible and can therefore constitute a disturbance to the viewing of the exhibits.

Therefore, there is the problem of totally preventing the risk of collapse of a showcase with glued walls but without introducing any visible elements that may disturb the viewing of the exhibits.

SUMMARY

Accordingly, the present invention relates to a showcase as defined in claim 1. Preferred features are described in the dependent claims.

More particularly, a showcase according to the invention has at least one vertical side wall, with an inner face and an outer face, and at least one horizontal upper wall, with a lower face and an upper face, wherein the side and upper walls are both of transparent material and are fixedly fastened to one another at respective edges, wherein the edges of the side and upper walls are shaped so as to comprise respective contact bands facing one another and glued to one another; the contact bands comprise two horizontal contact bands, one on the edge of the side wall, the other on the edge of the upper wall, and extending between an inner bound and an outer bound, wherein the outer bound is internal with respect to the outer face of the side wall.

In this way, the upper wall actually rests horizontally on the side wall and thus the weight of the upper wall weighs directly on the side wall, without stressing the adhesive with which they are glued, ensuring the safety of the showcase; furthermore, the junction line between the walls is not visible on the side wall, since the outer bound of the contact band does not reach the outer face of the side wall.

Preferably, the inner bound is at the inner face of the side wall. Towards the interior, in fact, the presence of a junction line does not affect the features of the showcase, as is not visible to the view of an external observer.

Preferably, the contact bands further comprise two vertical contact bands, one on the edge of the side wall, the other on the edge of the upper wall and extending between an inner bound and an outer bound, wherein the inner bound of the vertical contact bands is located at the outer bound of the horizontal contact bands. Any adhesive present between the vertical contact bands is not stressed by the weight of the upper wall, which—as said—is resting horizontally on the side wall. The presence of the vertical contact bands increases the bonding surface and facilitates the correct assembly of the showcase, ensuring the precise location of the upper wall with respect to the side wall.

In a preferred embodiment, the outer bound of the vertical contact bands is at the upper face of the upper wall. This conformation, relatively simple in execution, is advantageously usable for vertical showcases, where the upper face of the upper wall is not visible to the observer: the presence of a junction line on this face creates no disturbance.

In another preferred embodiment, the outer bound of the vertical contact bands is internal with respect to the upper face of the upper wall. This conformation, more complex in execution, is advantageously usable for horizontal showcases, where the upper face of the upper wall is visible to the observer: the presence of a junction line on this face would be a disturbance.

Preferably, the contact bands further comprise two oblique contact bands, tilted by a predetermined angle with respect to the horizontal plane, one on the edge of the side wall, the other on the edge of the upper wall, and extending between an inner bound and an outer bound, wherein the outer bound of the oblique contact bands is located at a corner of the showcase, between the upper face of the upper wall and the outer face of the side wall. The oblique contact bands have the main function of moving the junction line between the two walls to the edge of the showcase, at the meeting point of the outer face of the side wall with the upper face of the upper wall; in this position, the junction line is substantially invisible to any observer, completely mingling with the geometrical line of the edge. Preferably, the tilting angle of the oblique contact bands is 45°.

In a preferred embodiment, the inner bound of the oblique contact bands is at the outer bound of the horizontal contact bands.

In a preferred embodiment, provided with vertical contact bands, the inner bound of the oblique contact bands is at the outer bound of the vertical contact bands.

Preferably, the side wall and the upper wall are multilayered and comprise an inner panel and an outer panel coupled with each other.

In a preferred embodiment, the horizontal contact bands are formed on the inner panels of the side and upper walls.

In a preferred embodiment, the horizontal contact bands are formed on the inner panel of the side wall and on the outer panel of the upper wall.

In a preferred embodiment, the vertical contact bands are formed on the outer panel of the side wall and on both panels of the upper wall.

In a preferred embodiment, the vertical contact bands are formed on the outer panel of the side wall and on the inner panel of the upper wall.

In a preferred embodiment, the oblique contact bands are formed on the outer panel of the side wall and on the outer panel of the upper wall.

BRIEF DESCRIPTION OF THE DRAWINGS

Further features and advantages of a showcase according to the present invention will appear more clearly from the following description of some preferred embodiments thereof, made with reference to the accompanying drawings. In such drawings.

DETAILED DESCRIPTION

Figure 1:
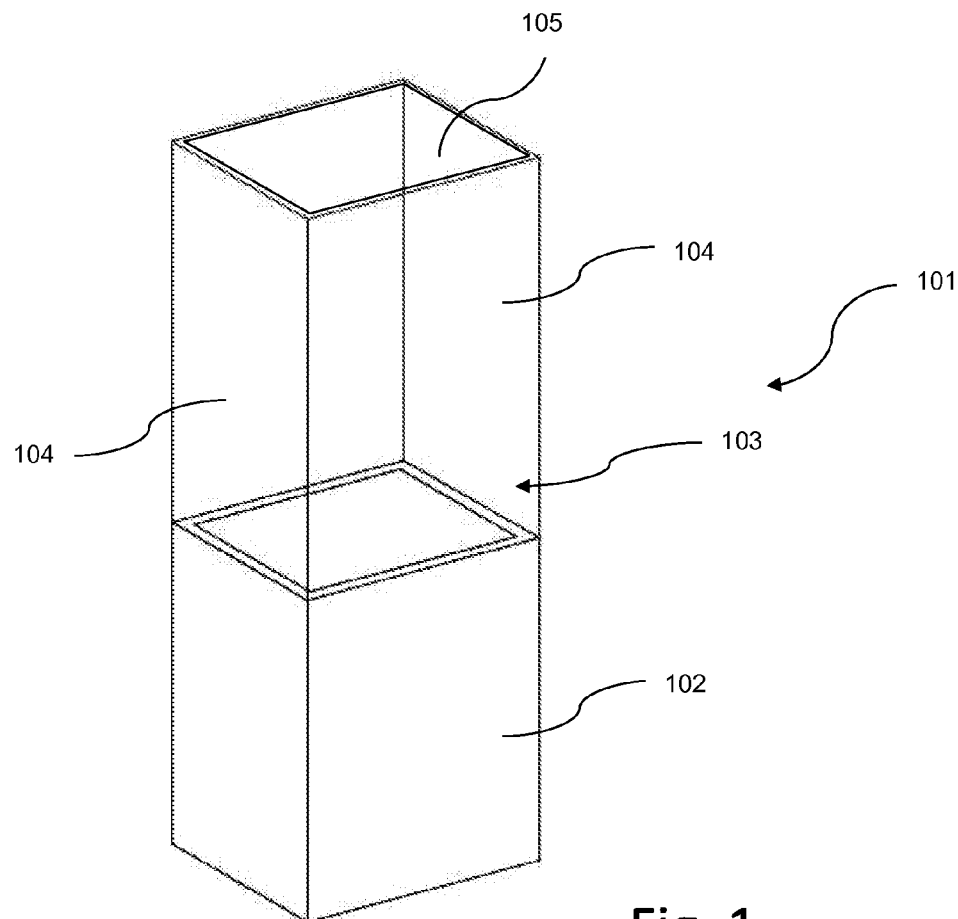
FIG. 1 is a schematic perspective view of a showcase according to a first embodiment of the invention.
Figure 2:
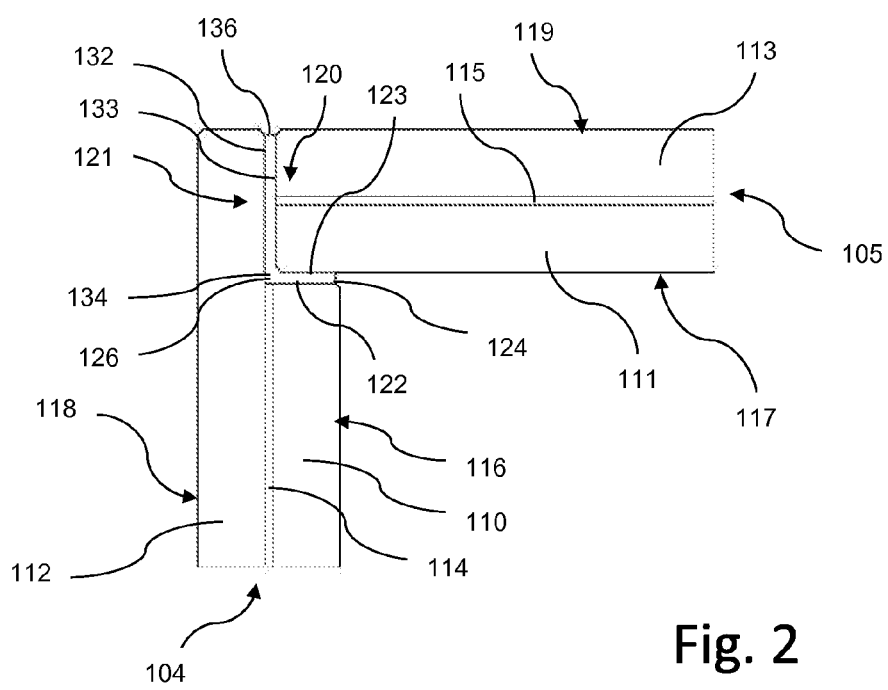
FIG. 2 is a sectional view on enlarged scale of a detail of the showcase in FIG. 1.

FIGS. 1 and 2 show a showcase 101 according to the invention, suitable for the preservation and display of objects. Showcase 101 includes a base 102 surmounted by a case 103, which is formed with vertical side walls 104 and a horizontal upper wall 105. The side walls 104 and the upper wall 105 are of transparent material, preferably glass. To allow access inside showcase 101, one or more of the side walls 104 may be opening or the entire case 103 may be lifted from base 102; hereinafter, the side walls 104 referred to are those fixed to the upper wall 105.

The side walls 104 are multilayered, formed each with an inner panel 110 and an outer panel 112 coupled to each other by a suitable intermediate layer 114; likewise, the upper wall 105 is multilayered, formed with an inner panel 111 and an outer panel 113 coupled to each other by a suitable intermediate layer 115. The inner panels 110 of walls 104 have inner faces 116 towards the interior of showcase 101; the outer panels 112 of walls 104 have outer faces 118 towards the exterior of showcase 101. The inner panel 111 of the upper wall 105 has a lower face 117 towards the interior of showcase 101; the outer panel 114 of wall 105 has an upper face 119 towards the exterior of showcase 101.

The side walls 104 are fixedly fastened to the upper wall 105 at respective edges 120 and 121, reciprocally facing each other. Edges 120, 121 of side and top walls are shaped so as to include respective contact bands facing one another and glued to one another.

In particular, showcase 101 includes first horizontal contact bands 122 and 123; the first contact band 122 is formed on edge 120 of each side wall 104, while the first contact band 123 is formed on each edge 121 of the upper wall 105. The first contact bands 122, 123 are extended between a common inner bound 124 thereof and a common outer bound 126 thereof, wherein the outer bound 124 is located at the inner face 116 of the side wall 104 while the outer bound 126 is internal with respect to the outer face 118 of the side wall 104.

The first horizontal contact bands 122, 123 are both formed on the inner panels 110, 111 of the side 104 and upper 105 walls.

Moreover, showcase 101 includes second vertical contact bands 132 and 133; the second contact band 132 is formed on edge 120 of each side wall 104, while the second contact band 133 is formed on each edge 121 of the upper wall 105. The second contact bands 132, 133 are extended between a common inner bound 134 thereof and a common outer bound 136 thereof, wherein the outer bound 134 is located at the outer bound 126 of the first contact bands 122, 123 while the outer bound 136 is located at the upper face 119 of the upper wall 105.

The second vertical contact bands 132, 133 are formed on the outer panel 112 of the side wall 104 and on both inner 111 and outer 113 panels of the upper wall 105.

Thanks to the above structure, in showcase 101 the partition line between the side walls 104 and the upper wall 105 is located on the upper face 119, therefore in a position substantially invisible when showcase 101 is taller than a person. Moreover, while showcase 101 looks substantially all glass to sight, its strength is very high and any possible risk of collapse is excluded due to the fact that the weight of the upper wall 105 weighs on the side walls 104 thanks to the flat support at the first horizontal contact bands 122, 123; even a possible failure of the bonding between wall 105 and walls 104 does not result in a collapse of showcase 101.

Figure 3:
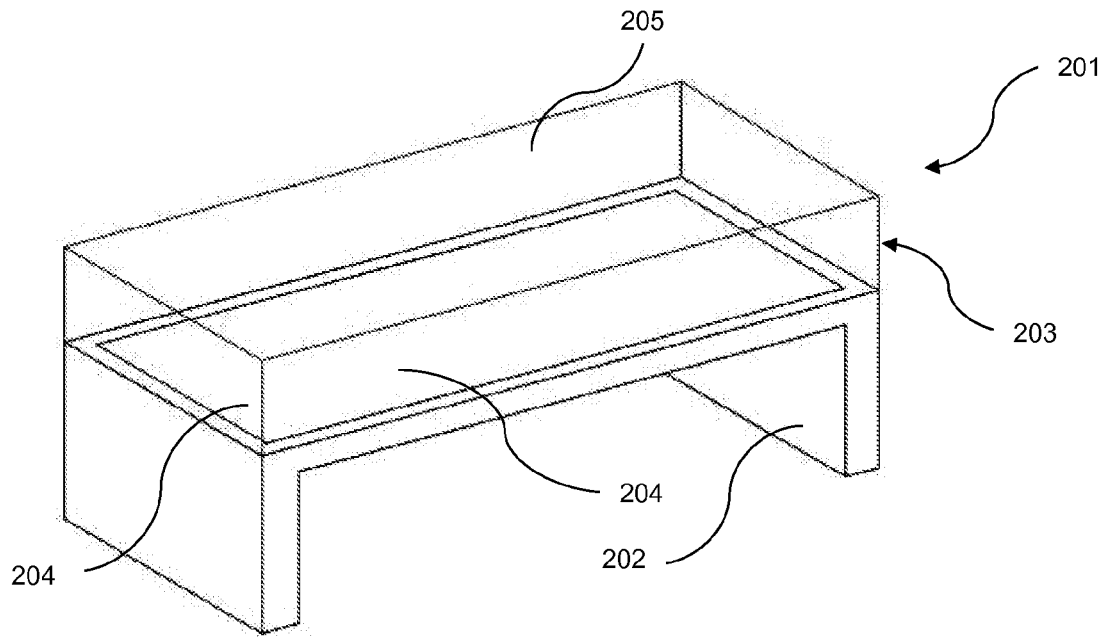
FIG. 3 is a schematic perspective view of a of a showcase according to a second embodiment of the invention.
Figure 4:
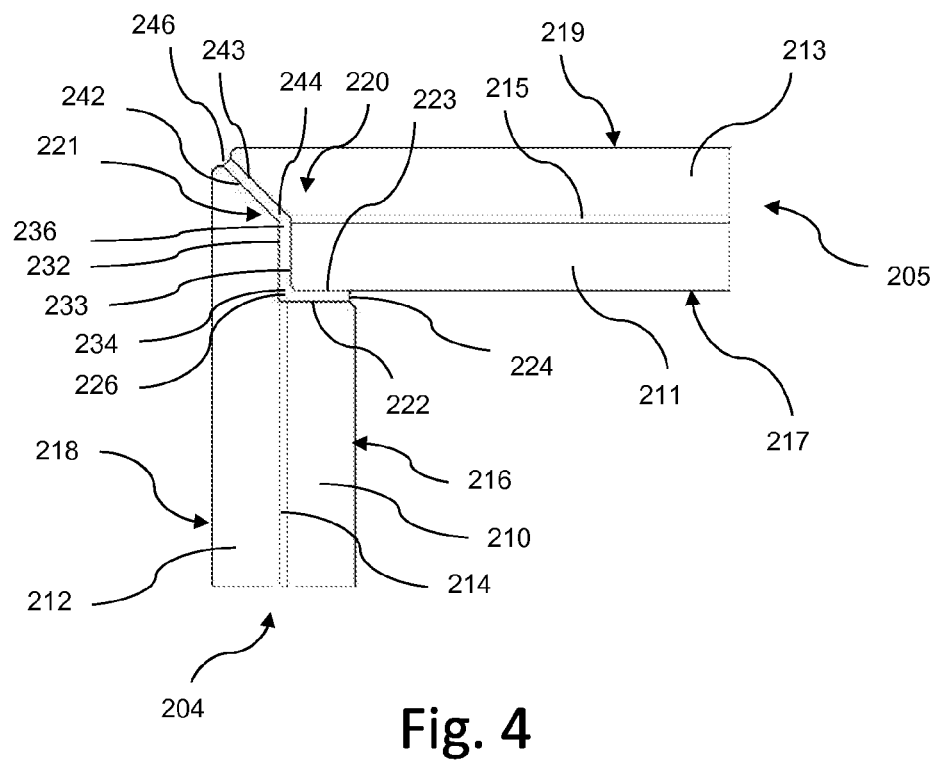
FIG. 4 is a sectional view on enlarged scale of a detail of the showcase in FIG. 3.

FIGS. 3 and 4 show a showcase 201 according to another embodiment of the invention. Showcase 201 includes a base 202 surmounted by a case 203, which is formed with vertical side walls 204 and a horizontal upper wall 205. The side walls 204 and the upper wall 205 are of transparent material, preferably glass. To allow access inside showcase 201, one or more of the side walls 204 may be opening or the entire case 203 may be lifted from base 202; hereinafter, the side walls 204 referred to are those fixed to the upper wall 205.

As with showcase 101, the side walls 204 are multilayered, formed each with an inner panel 210 and an outer panel 212 coupled to each other by a suitable intermediate layer 214; likewise, the upper wall 205 is multilayered, formed with an inner panel 211 and an outer panel 213 coupled to each other by a suitable intermediate layer 215. The inner panels 210 of walls 204 have inner faces 216 towards the interior of showcase 201; the outer panels 212 of walls 204 have outer faces 218 towards the exterior of showcase 201. The inner panel 211 of the upper wall 205 has a lower face 217 towards the interior of showcase 201; the outer panel 214 of wall 205 has an upper face 219 towards the exterior of showcase 201.

The side walls 204 are fixedly fastened to the upper wall 205 at respective edges 220 and 221, reciprocally facing each other. Edges 220, 221 of side and top walls are shaped so as to include respective contact bands facing one another and glued to one another.

In particular, showcase 201 includes first horizontal contact bands 222 and 223; the first contact band 222 is formed on edge 220 of each side wall 204, while the first contact band 223 is formed on each edge 221 of the upper wall 205. The first contact bands 222, 223 are extended between a common inner bound 224 thereof and a common outer bound 226 thereof, wherein the outer bound 224 is located at the inner face 216 of the side wall 204 while the outer bound 226 is internal with respect to the outer face 218 of the side wall 204.

The first horizontal contact bands 222, 223 are both formed on the inner panels 210, 211 of the side 204 and upper 205 walls.

Moreover, showcase 201 includes second vertical contact bands 232 and 233; the second contact band 232 is formed on edge 220 of each side wall 204, while the second contact band 233 is formed on each edge 221 of the upper wall 205. The second contact bands 232, 233 are extended between a common inner bound 234 thereof and a common outer bound 236 thereof, wherein the outer bound 234 is located at the outer bound 226 of the first contact bands 222, 223 while the outer bound 236 is internal with respect to the outer face 218 of the side wall 204.

The second vertical contact bands 232, 233 are formed on the outer panel 212 of the side wall 204 and on the inner panel 211 of the upper wall 205.

Moreover, showcase 201 has third oblique contact bands 242 and 243, tilted with respect to a horizontal plane (i.e. with respect to the upper face 219 of wall 205) by a predetermined angle, preferably equal to 45°; the third contact band 242 is formed on edge 220 of each side wall 204, while the third contact band 243 is formed on each edge 221 of the upper wall 205. The third contact bands 242, 243 are extended between a common inner bound 244 thereof and a common outer bound 246 thereof, wherein the outer bound 244 is located at the outer bound 236 of the second contact bands 232, 233 while the outer bound 246 is located at an upper corner of showcase 201, between the upper face 219 of the upper wall 205 and the outer face 218 of the side wall 204.

The third oblique contact bands 242, 243 are formed on the outer panel 212 of the side wall 204 and on the outer panel 213 of the upper wall 205.

Thanks to the above structure, in showcase 201 the partition line between the side walls 204 and the upper wall 205 is located on the corner of showcase 201, therefore in a position substantially invisible even when showcase 201 is shorter than a person, who can therefore observe from above. Moreover, while showcase 201 looks substantially all glass to sight, its strength is very high and any possible risk of collapse is excluded due to the fact that the weight of the upper wall 205 weighs on the side walls 204 thanks to the flat support at the first horizontal contact bands 222, 223; even a possible failure of the bonding between wall 205 and walls 204 does not result in a collapse of showcase 201.

Figure 5:
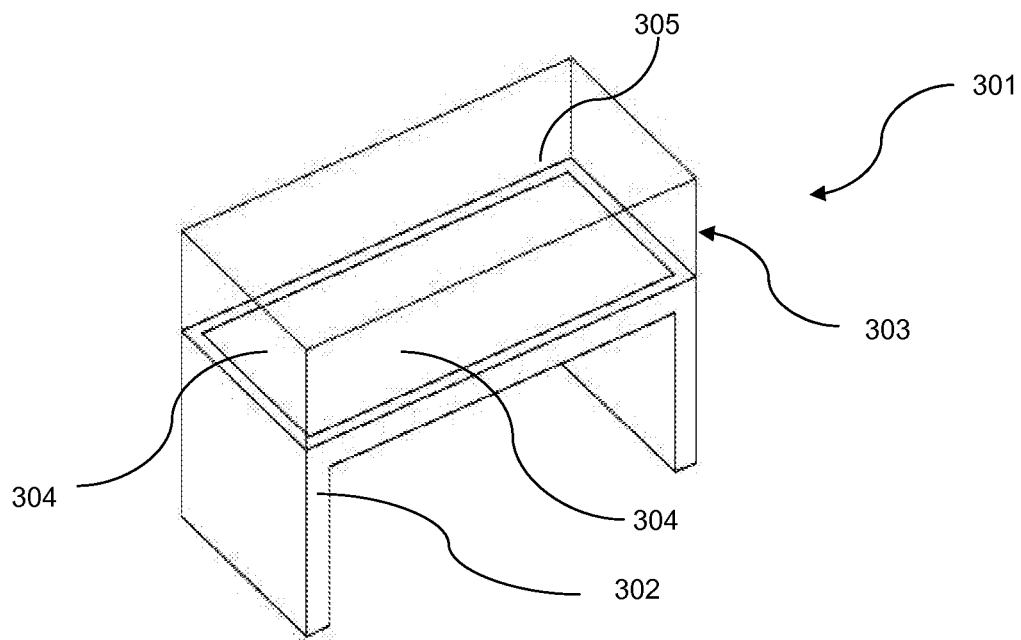
FIG. 5 is a schematic perspective view of a showcase according to a third embodiment of the invention.
Figure 6:
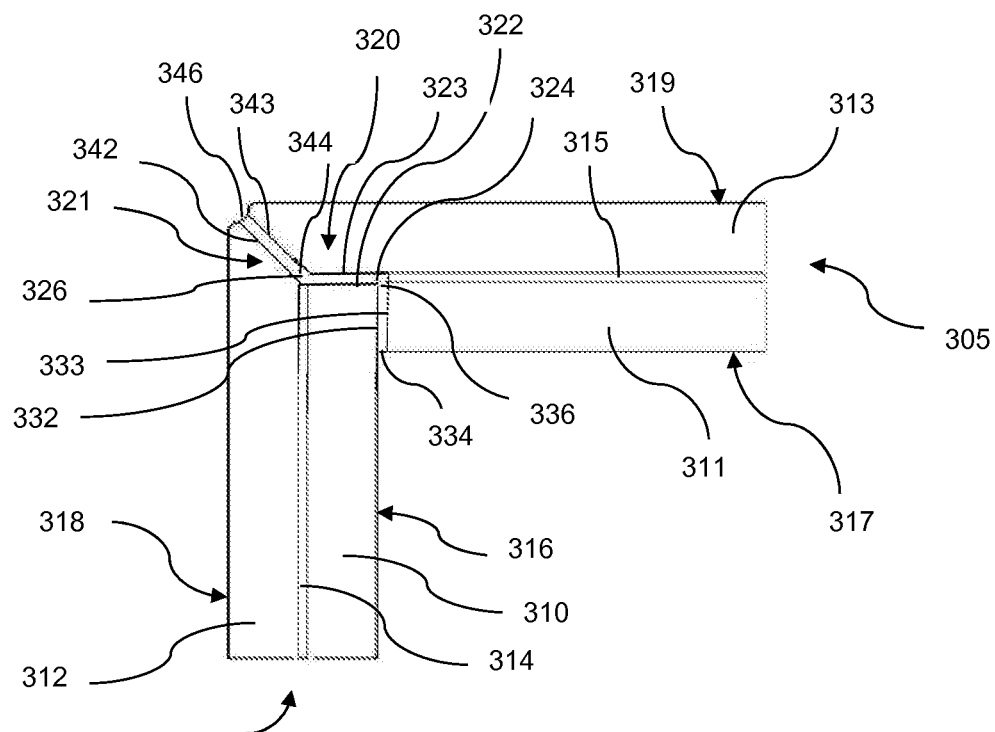
FIG. 6 is a sectional view on enlarged scale of a detail of the showcase in FIG. 5.

FIGS. 5 and 6 show a showcase 301 according to another embodiment of the invention. Showcase 301 includes a base 302 surmounted by a case 303, which is formed with vertical side walls 304 and a horizontal upper wall 305. The side walls 304 and the upper wall 305 are of transparent material, preferably glass. To allow access inside showcase 301, one or more of the side walls 304 may be opening or the entire case 303 may be lifted from base 302; hereinafter, the side walls 304 referred to are those fixed to the upper wall 305.

As with showcase 101 and showcase 201, the side walls 304 are multilayered, formed each with an inner panel 310 and an outer panel 312 coupled to each other by a suitable intermediate layer 314; likewise, the upper wall 305 is multilayered, formed with an inner panel 311 and an outer panel 313 coupled to each other by a suitable intermediate layer 315. The inner panels 310 of walls 304 have inner faces 316 towards the interior of showcase 301; the outer panels 312 of walls 304 have outer faces 318 towards the exterior of showcase 301. The inner panel 311 of the upper wall 305 has a lower face 317 towards the interior of showcase 301; the outer panel 314 of wall 305 has an upper face 319 towards the exterior of showcase 301.

The side walls 304 are fixedly fastened to the upper wall 305 at respective edges 320 and 321, reciprocally facing each other. Edges 320, 321 of side and top walls are shaped so as to include respective contact bands facing one another and glued to one another.

In particular, showcase 301 includes first horizontal contact bands 322 and 323; the first contact band 322 is formed on edge 320 of each side wall 304, while the first contact band 323 is formed on each edge 321 of the upper wall 305. The first contact bands 322, 323 are extended between a common inner bound 324 thereof and a common outer bound 326 thereof, wherein the outer bound 324 is internal with respect to the inner face 316 of the side wall 304 and the outer bound 326 is internal with respect to the outer face 318 of the side wall 304.

The first horizontal contact bands 322, 323 are formed on the outer panels 310 of the side walls 304 and on the outer panel 313 of the upper wall 305.

Moreover, showcase 301 includes second vertical contact bands 332 and 333; the second contact band 332 is formed on edge 320 of each side wall 304, while the second contact band 333 is formed on each edge 321 of the upper wall 305. The second contact bands 332, 333 are extended between a common inner bound 334 thereof and a common outer bound 336 thereof, wherein the outer bound 334 is located at the inner face 316 of the side wall 304 while the outer bound 336 is located at the inner bound 324 of the first contact bands 322, 323.

The second vertical contact bands 332, 333 are formed on the inner panel 310 of the side wall 304 and on the outer panel 313 of the upper wall 305.

Moreover, showcase 301 includes third vertical contact bands 342 and 343; the third contact band 342 is formed on edge 320 of each side wall 304, while the third contact band 343 is formed on each edge 321 of the upper wall 305. The third contact bands 342, 343 are extended between a common inner bound 344 thereof and a common outer bound 346 thereof, wherein the outer bound 344 is located at the outer bound 326 of the first contact bands 322, 323 while the outer bound 346 is located at an upper corner of showcase 301, between the upper face 319 of the upper wall 305 and the outer face 318 of the side wall 304.

The third oblique contact bands 342, 343 are formed on the outer panel 312 of the side wall 304 and on the outer panel 313 of the upper wall 305.

Thanks to the above structure, in showcase 301 the partition line between the side walls 304 and the upper wall 305 is located on the corner of showcase 301, therefore in a position substantially invisible even when showcase 301 is shorter than a person, who can therefore observe from above. Moreover, while showcase 301 looks substantially all glass to sight, its strength is very high and any possible risk of collapse is excluded due to the fact that the weight of the upper wall 305 weighs on the side walls 304 thanks to the flat support at the first horizontal contact bands 322, 323; even a possible failure of the bonding between wall 305 and walls 304 does not result in a collapse of showcase 301.

Of course, other configurations are possible, all falling within the scope defined by the following claims.

The invention claimed is:

1. A showcase comprising:
    at least a vertical side wall, with an inner face and an outer face, and
    at least a horizontal upper wall, with a lower face and an upper face,
        wherein the side and upper walls are both made of a transparent material and are fixedly fastened to one another at respective edges thereof,
        wherein the edges of the side and upper walls are shaped so as to comprise respective contact bands facing one another and glued to one another,
        wherein the contact bands comprise two horizontal contact bands, one on the edge of the side wall the other on the edge of the upper wall, and extending between an inner bound and an outer bound of the horizontal contact bands, the outer bound of the horizontal contact bands being internal with respect to the outer face of the side wall, and
        wherein the contact bands further comprise two oblique contact bands, tilted of a predetermined angle with respect to a horizontal plane, one on the edge of the side wall the other on the edge of the upper wall, and extending between an inner bound and an outer bound of the oblique contact bands, wherein the outer bound of the oblique contact bands is located at a corner of the showcase, between the upper face of the upper wall and the outer face of the side wall.

2. The showcase according to claim 1, wherein the inner bound of the horizontal contact bands is located at the inner face of the side wall.

3. The showcase according to claim 1, wherein the side wall and the upper wall are multilayered and comprise an inner panel and an outer panel coupled with each other, and wherein the horizontal contact bands are formed on the inner panels of the side and upper walls.

4. The showcase according claim 1, wherein the side wall and the upper wall are multilayered and comprise an inner panel and an outer panel coupled with each other, and wherein the oblique contact bands are formed on the outer panel of the side wall and on the outer panel of the upper wall.

5. A showcase comprising:
    at least a vertical side wall, with an inner face and an outer face, and
    at least a horizontal upper wall, with a lower face and an upper face,
        wherein the side and upper walls are both made of a transparent material and are fixedly fastened to one another at respective edges thereof,
        wherein the edges of the side and upper walls are shaped so as to comprise respective contact bands facing one another and glued to one another,
        wherein the contact bands comprise two horizontal contact bands, one on the edge of the side wall the other on the edge of the upper wall, and extending between an inner bound and an outer bound of the horizontal contact bands, the outer bound of the horizontal contact bands being internal with respect to the outer face of the side wall, and
        wherein the contact bands further comprise two vertical contact bands, one on the edge of the side wall the other on the edge of the upper wall, and extending between an inner bound and an outer bound, wherein the inner bound of the vertical contact bands is located at the outer bound of the horizontal contact bands.

6. The showcase according to claim 5, wherein the outer bound of the vertical contact bands is located at the upper face of the upper wall.

7. The showcase according to claim 5, wherein the contact bands further comprise two oblique contact bands, tilted of a predetermined angle with respect to a horizontal plane, one on the edge of the side wall the other on the edge of the upper wall, and extending between an inner bound and an outer bound, wherein the outer bound of the oblique contact bands is located at a corner of the showcase, between the upper face of the upper wall and the outer face of the side wall.

8. The showcase according to claim 7, wherein the inner bound of the oblique contact bands is located at the outer bound of the vertical contact bands.

9. The showcase according to claim 5, wherein the side wall and the upper wall are multilayered and comprise an inner panel and an outer panel coupled with each other, and wherein the vertical contact bands are formed on the outer panel of the side wall and on both panels of the upper wall.

10. The showcase according to claim 5, wherein the side wall and the upper wall are multilayered and comprise an inner panel and an outer panel coupled with each other, and wherein the vertical contact bands are formed on the outer panel of the side wall and on the inner panel of the upper wall.

\* \* \* \* \*